United States Patent [19]

Bomark

[11] Patent Number: 5,092,562
[45] Date of Patent: Mar. 3, 1992

[54] FELLING BAR WITH STRIKING LUG

[75] Inventor: Mats Bomark, Edsbyn, Sweden

[73] Assignee: Sandvik AB, Sandviken, Sweden

[21] Appl. No.: 238,585

[22] Filed: Aug. 31, 1988

[30] Foreign Application Priority Data

Sep. 2, 1987 [SE] Sweden ................................. 8703392

[51] Int. Cl.⁵ ............................................... B66F 3/00
[52] U.S. Cl. ...................................... 254/104; 254/19; 254/131
[58] Field of Search .................. 254/104, 19, 21, 131, 254/133 R

[56] References Cited

U.S. PATENT DOCUMENTS

| | | | |
|---|---|---|---|
| 1,356,413 | 10/1920 | Staub | 254/104 |
| 2,804,109 | 8/1957 | Fahca | 254/104 |
| 4,625,489 | 12/1986 | Bögle | 254/104 |
| 4,748,704 | 7/1988 | Houdek | 254/104 |

FOREIGN PATENT DOCUMENTS 802602  2/1951  Fed. Rep. of Germany ...... 254/104

*Primary Examiner*—J. J. Hartman
*Attorney, Agent, or Firm*—Burns, Doane, Swecker & Mathis

[57] ABSTRACT

According to the invention, a felling bar to be used in tree felling has a handle 11 in one end and a lever plate in the other. To make is usable for driving wedges into a sawn cut, the felling bar is provided with a striking lug 17 fastened to the shaft 10 of the felling bar at or close to the connecting portion 15 joining the lever plate 12 to the shaft 10.

4 Claims, 1 Drawing Sheet

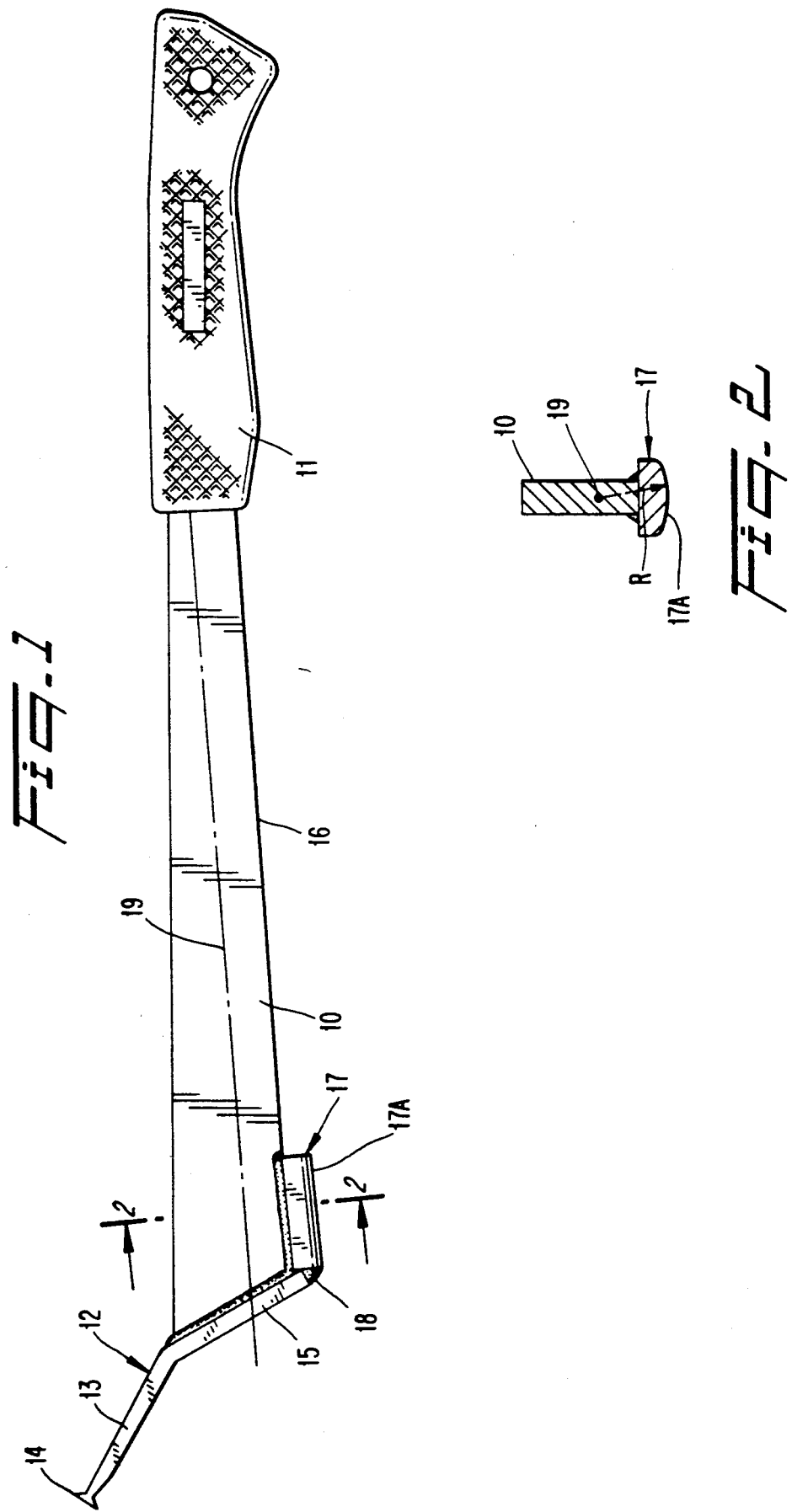

FELLING BAR WITH STRIKING LUG

BACKGROUND AND OBJECT OF THE INVENTION

The invention concerns a felling bar of the type used in felling of trees, comprising an elongated shaft, one end of which is shaped as a handle, and the other end is turned into a toothed lever plate.

Felling bars are used in felling of trees to topple the trees after most of the tree trunk has been sawn through with a chainsaw. The lever plate is thus inserted in the cut as soon as there is space enough behind the chainsaw guide bar, and functions initially as a wedge to keep the tree from leaning backwards which would make the chainsaw stick in the cut. When the chainsaw has reached far enough, the cut can be opened by pressing the handle of the felling bar upwards or downwards, to force the tree to fall in the desired direction.

In trees with soft outer layers of wood, such as certain deciduous trees, and in especially thick trees, the carrying ability of the lever plate is insufficient, and one or more wedges with greater thickness are driven into the cut, and only the final toppling of the tree is done with the felling bar. To drive the wedges, a blunt-headed axe is traditionally used, which can also be used for limbing and other minor tasks.

Using an axe as a striking tool carries considerable risks for injury from the edge, and from axe heads falling off from the handle if the hole becomes deformed. It is also desirable to lower the weight of the set of tools carried by the forest worker.

The invention aims to solve the described problems by a new type of felling bar. The special feature of the new felling bar according to the invention is that it has been provided with a striking lug, whereby this tool becomes useful both as a felling bar and as a hammer for driving wedges.

BRIEF DESCRIPTION OF THE DRAWINGS

The invention will be further explained in the following with reference to the accompanying drawing, wherein FIG. 1 shows one embodiment of the invention in a lateral view and FIG. 2 is a cross-sectional view taken alone line 2—2 of FIG. 1.

DESCRIPTION OF A PREFERRED EMBODIMENT OF THE INVENTION

The shown embodiment of the invention comprises an elongated shaft 10, one end of which is shaped as a handle 11 with a comfortable grip. The shaft 10 can be made hollow, with round or rectangular section. The shaft 10 carries in the other end a lever plate 12 made as a forged or plastically formed blade-like steel part. The forward portion 13 of the lever plate 12 is provided with swagged sharp teeth 14 extending in opposite directions transversely of the plane of portion 13, for the purpose of preventing the plate from slipping out of the sawn cut when the plate is tilted up or down.

The connecting portion 15 joining the front plate 12 to the shaft 10 is preferably angled against the forward plate portion 13 with the teeth.

In addition a plate serving as a striking lug 17 is fastened to the underside 16 of the shaft 10, close to the connecting portion 15. This striking lug 17 is preferably made from thicker steel than the lever plate 12, with a convex surface 17A and with a rounded transition 18 adjoining the connecting portion 15 between the lever plate 12 and the shaft 10.

A felling bar according to the invention can also in a known manner be provided with a turning hook, hingedly joined to the shaft 10 at an appropriate distance from the lever plate 12, and together with the lever plate 12 usable for turning the felled tree trunks.

The convex surface 17A of the striking lug 17 is preferably shaped as a cylinder with an axis 19 through the center of gravity of the felling bar and through the middle of the thickness of the handle 11, to prevent rotation of the felling bar around its longitudinal axis from the striking impact. The cylindrical surface 17A is generated by a radius R extending from the axis 19.

The center of gravity of the complete felling bar should preferably be located so near the striking lug 17, that the product of the distance from the center of gravity to the middle of the handle 11, with the distance from the center of gravity to the striking lug 17 equals the square of the radius of inertia. In this way the felling bar will transfer no striking impact to the handle.

I claim:

1. Felling bar comprising a longitudinally elongated shaft, a rear end of which shaft being shaped as a handle, a lever plate attached to a front end of the shaft and including a transversely extending front edge for engaging a tree to be felled, and a metallic striking lug disposed adjacent to the lever plate, wherein the striking lug presents a substantially cylindrically convex striking surface as viewed in cross-section through the bar.

2. Felling bar according to claim 1, wherein a longitudinal axis of the cylindrical striking surface passes substantially through the center of gravity of the handle.

3. Felling bar according to claim 1, wherein the lever plate comprises front and rear portions disposed at an angle to one another, the rear portion joining the striking lug with a smoothly rounded transition and the front portion including the front edge.

4. Felling bar according to claim 3, wherein the front edge including a plurality of teeth extending transversely of a plane of the front portion of the lever plate.

* * * * *